United States Patent [19]
Bureau

[11] Patent Number: 5,730,282
[45] Date of Patent: *Mar. 24, 1998

[54] COMBINED PORTABLE CONTAINER AND COLLAPSIBLE TABLE WITH SELF-LOCKING HANDLE/LEG HOLDERS

[76] Inventor: H. Lee Bureau, 3 Park Ave., Waterville, Me. 04901

[*] Notice: The term of this patent shall not extend beyond the expiration date of Pat. No. 5,551,558.

[21] Appl. No.: 659,340

[22] Filed: Jun. 6, 1996

Related U.S. Application Data

[63] Continuation-in-part of Ser. No. 327,091, Oct. 20, 1994, Pat. No. 5,551,558, which is a continuation-in-part of Ser. No. 26,782, Jul. 1, 1994, Pat. No. Des. 368,387.

[51] Int. Cl.⁶ .................................................. B65D 43/00
[52] U.S. Cl. .................. 206/223; 206/223; 312/258; 190/11; 220/23.86
[58] Field of Search ........................... 312/241, 140.2, 312/258; 190/18; 62/258, 457.7; 296/216, 223; 220/23.83, 23.86

[56] References Cited

U.S. PATENT DOCUMENTS

| | | | |
|---|---|---|---|
| 2,609,072 | 9/1952 | Levinson | 190/11 |
| 2,693,258 | 11/1954 | Fleisch | 190/11 |
| 4,893,711 | 1/1990 | Gustafson | 190/11 X |
| 4,934,549 | 6/1990 | Allen | 190/11 X |
| 5,551,558 | 9/1996 | Bureau | 206/223 |

Primary Examiner—Jacob K. Ackun
Attorney, Agent, or Firm—Pearson & Pearson

[57] ABSTRACT

A portable container of the type generally used for retaining within a receptacle storage area items and thermal units, such as a refrigeration unit or ice packs, so as to maintain such items at a differential temperature relative to ambient temperature. The container includes U-shaped members positionable in a first position extending above and across the receptacle to define handle elements for carrying the receptacle and in a second position extending below the receptacle to define leg elements for supporting the receptacle thereabove. The invention further includes a mechanism for locking the U-shaped members in the second position and such mechanism comprises a handle/leg holder for attaching the U-shaped members directly to the sides of the receptacle. One embodiment employs a spring for providing proper tensions on the U-shaped members when in the locked and unlocked positions and another embodiment employs a non-spring holder secured by a wing nut.

6 Claims, 12 Drawing Sheets

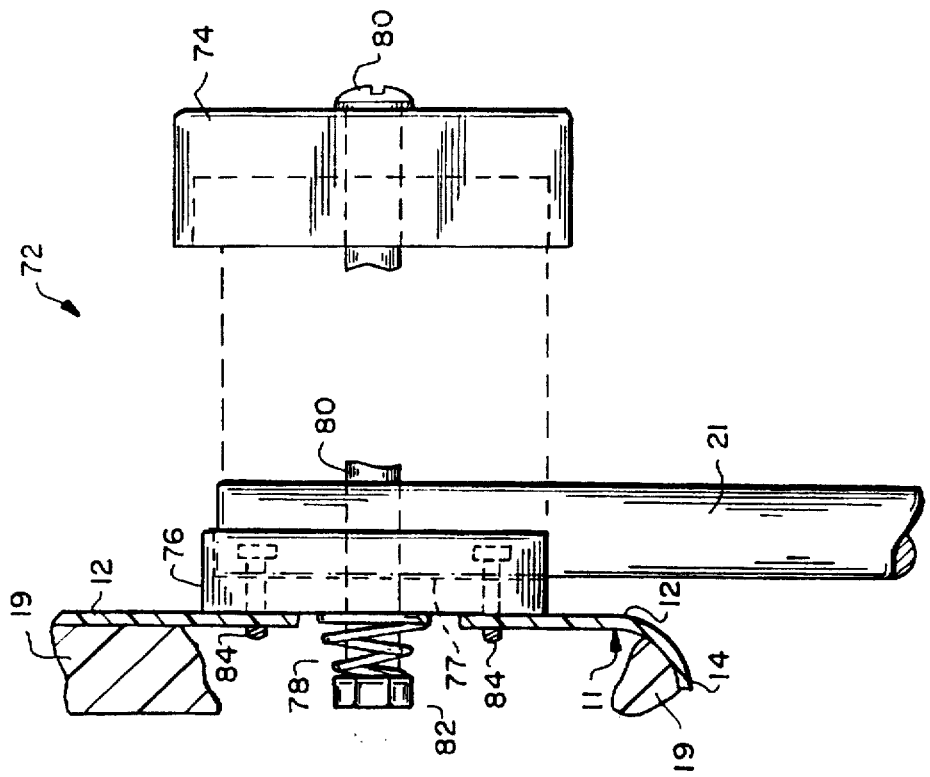
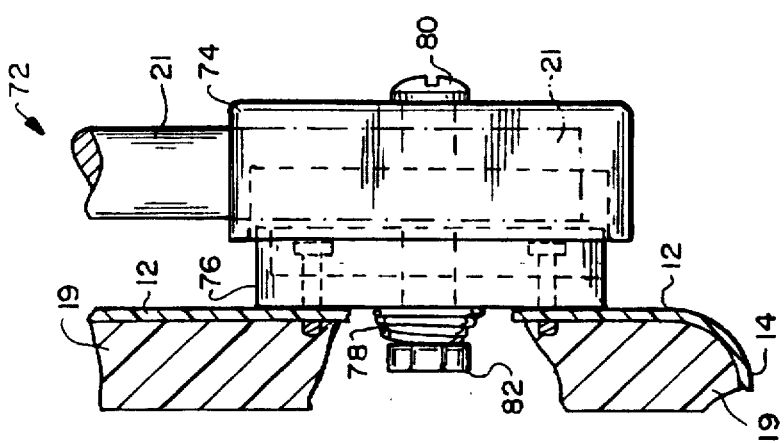
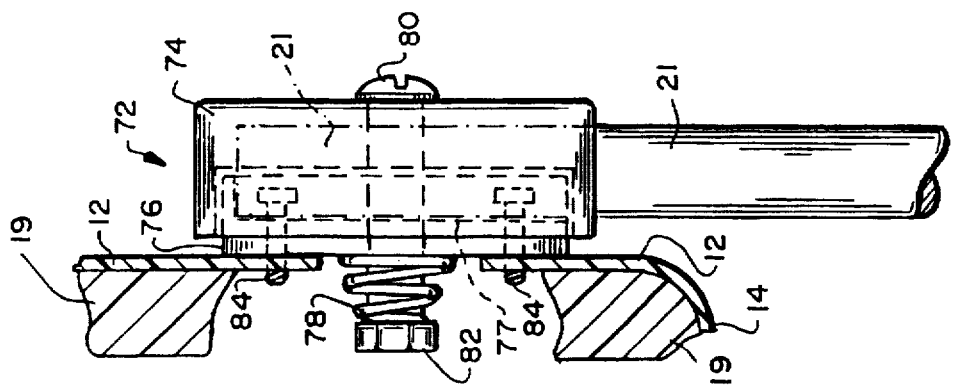

5,730,282

COMBINED PORTABLE CONTAINER AND COLLAPSIBLE TABLE WITH SELF-LOCKING HANDLE/LEG HOLDERS

CROSS REFERENCE TO RELATED APPLICATIONS

This is a continuation-in-part of application Ser. No. 08/327,091, filed Oct. 20, 1994 for an IMPROVED COMBINED COOLER AND COLLAPSIBLE TABLE, now U.S. Pat. No. 5,551,558 which was a continuation-in-part of Ser. No. 29/026,782, filed Jul. 1, 1994 for A COMBINED COOLER AND COLLAPSIBLE TABLE, now U.S. Pat. No. Des. 368,387, issued Apr. 2, 1996.

BACKGROUND OF THE INVENTION

1. Field of the Invention

This invention relates to storage containers and more particularly to improved portable containers that are easier to transport and more functional than prior art containers.

2. Description of Related Art

Picnic coolers are an example of the type of portable containers to which this invention relates. People typically use such portable containers to maintain items therein, such as food and beverages, at a cooler temperature relative to the ambient temperature outside the container. Generally, some element or device, like ice, freezer packs, or even a refrigeration unit, connects with the air in the container so as to improve the maintenance of the temperature differential. It will be understood that in some cases heaters, heat packs or the like maintain an elevated temperature in the container so as to maintain items therein at a higher temperature relative to the ambient temperature outside the container.

Such portable storage containers are frequently used by campers, picnickers and others to maintain food and beverages and other items at a differential temperature relative to the ambient temperature. These containers are preferably sized to be large enough to carry sufficient items e.g., food and beverages) and thermal transfer media such as ice or freezer packs. Many such storage containers also include integral handles to facilitate transport of the container. However, the larger the storage area of the container the heavier the device becomes in a loaded condition. The weight of such containers when loaded and the overall size of such devices seriously limit the portability of even the containers having handles. Additionally, campers and picnickers frequently carry other equipment with them such as tables that further increases the burdens associated with transit of the container and other equipment.

U.S. Pat. No. 4,515,421 to Steffes (1985) discloses an insulating container and a planar member adapted to be supported in a variety of location and positions in, from, and on the cooler. Specifically, the planar member can be supported in the cooler vertically as a divider or horizontally as a shelf for supporting items above the bottom of the container. Additionally, the container can receive and support the planar member along an outer side to form a horizontal shelf extending from the container. Finally, the planar member is also suited for placement on the cover of the container to define a cutting board surface.

U.S. Pat. No. 4,581,902 to Starck et al. (1986) discloses an insulating container including an associated table that is retained adjacent a cover of the container in a first position. In a second deployed condition the table is supported over the cover by extending legs through the cover such that the container forms the support for the legs. Starck et al. further disclose a segmented table surface with leaves hingedly mounted to a central portion of the table to define an enlarged support surface of the table.

U.S. Pat. No. 3,347,060 to Barkan (1967) discloses an portable insulating box that comprises an open top container and cover. The box also includes a powered refrigeration unit carried with the container. The container includes inflatable tubes defining the upper portion of side walls of the container. Selective inflation and deflation of the tubes enables resizing of the container to accommodate various quantities and sizes of items to be placed within the container.

Portable storage containers or trunks not adapted for holding items at a different temperature relative to the ambient temperature are also known. U.S. Pat. No. 592,159 to Miller (1897), for example, discloses a storage trunk with a storage tray for supporting items within the trunk that mounts on the upper surface of the trunk to define a table surface. The tray includes hinged sides which move from a first position defining the tray to a second deployed condition to increase the area of the table formed by the tray.

U.S. Pat. No. 4,436,353 to Tucker (1984) discloses another example of a portable storage device and table. The device comprises a trunk including a base, an inner tray, and a cover. The cover includes hinged mounted panels. The top panel of the cover and the tray which is hinged secured to the base opposite the top panel of the cover form upwardly extending support members for a table surface. The table surface is formed by a second panel of the cover extending between the tray and the top panel when in their extending support member positions. Third and fourth panels hingedly secured to the second panel in a deployed condition define with the second panel an enlarged table surface.

Other devices which incorporate a cooling container and a table are also known. U.S. Pat. No. 2,093,856 to Wales (1937), for example, discloses a refrigerator that is supported from a table with an upper surface comprising a portion of the support surface of the table. Access to items in the refrigerator occurs by raising a portion of the refrigerator including the upper surface relative to the remainder of the table. Similarly, U.S. Pat. No. 2,895,311 to Spalvins (1959) discloses a table and refrigerator where an upper portion of the refrigerator forms a portion of the table. The refrigerator base in this instance, however, supports the table surface. Access to the refrigerator in Spalvins, like Wales, occurs by raising a common portion the table surface and refrigerator.

The foregoing references disclose a plurality of portable tables, refrigeration/insulating containers, and combined storage devices and tables. However, the references do not provide a portable container for containing items to maintained within a temperature range having combined support members that support the portable container in a suspended condition and support the container above the members in a raised condition with the upper surface of the container defining a table. The references do not disclose a portable container for containing items to be maintained within a temperature range having an expansible lid or cover that unfolds to define a table surface while maintaining items in the container in a closed compartment of the container. Finally, the references fail to provide a portable insulating container that is also easily transportable.

SUMMARY

Therefore it is an object of this invention to provide a portable container having support members for selective positioning as support legs and as support handles.

Another object of this invention is to provide a combination portable container for maintaining items within a temperature range and for serving as a raised table.

Still another object of this invention is to provide a portable container for maintaining items within a temperature range that is easily transported by users thereof.

Still another object of this invention is to provide a portable container form maintaining items within a temperature range that is both easily transported by users and serves as a raised table.

Yet still another object of this invention is to provide a portable container for maintaining items within a temperature range and for selective configuration as a raised table while providing relatively easy access to a storage portion of the container.

A further object of this invention to provide a portable container having support members for selective positioning as support legs and as support handles that is easily transported by users.

Still a further object of this invention to provide a portable container having support members for selective positioning as support legs and as support handles that is both easily transported by users and serves as a raised table. A further object of this invention is to provide a portable container with handle/leg holders for securing the U-shaped members to the sides of the container.

Still a further object of this invention is to provide a portable container, having support members for selective positioning as self-locking support legs and as support handles, that is easily transported by users.

The objects are further accomplished by providing a portable container having a bottom portion and side portions defining a receptacle of a predetermined maximum width and height, the improvement of means for connection to the receptacle for acting as support legs and a carrying handle comprising first and second leg means for attachment to opposite sides of the receptacle, each of the first and second leg means comprising a U-shaped leg member having first and second leg portions extending from each side of the receptacle to free ends thereof at a distance that is greater than the maximum height of the receptacle, means for connecting each leg portion to the side portion of the receptacle, and the connecting means comprising means for self-locking the leg portion and enabling the leg portion to be easily unlocked and rotated whereby the free ends become the carrying handle. The connecting means comprises axial means for the leg portion to rotate around, and spring means positioned on the axial means for enabling the leg portion to be held in a self-locking position and for enabling the leg portion to be pulled out of the self-locking position and rotated on the axial means to the carrying handle position. The connecting means comprises a base plate means for attaching the connecting means to the side portion of the receptacle. The base plate means comprises a semi-cylindrical groove to facilitate self-locking the leg portion.

The objects are further accomplished by providing a portable container having a self locking handle/leg holder attached to the side of a container for securing a tubular member comprising a base plate means for attaching the holder to the container, means within the base plate means for inserting a portion of the tubular member, means for covering the tubular member positioned in the base plate means wherein a portion of a side of the covering means comprises a U-shaped cut-out to permit the tubular member to protrude into the covering means, bolt means inserted through the combination of the covering means, the tubular member and the base plate means and within the side of the container for securing the combination, and tension means positioned on the bolt means for self-locking the tubular member in a supporting leg position and enabling the tubular member to be pulled-out and rotated to an unlocked handle position. The base plate means comprises a semi-cylindrical groove for inserting the portion of the tubular member. The tension means comprises a conical spring positioned on the bolt means between a nut and the base plate means so as to protrude into the side of the container. In another embodiment the tension means comprises a conical spring positioned on the bolt means outside of the covering means between the covering means and a nut.

The objects are further accomplished by providing a portable container having a handle/leg holder attached to the side of the container for securing a tubular member comprising a base plate means for attaching the holder to the container, means within the base plate means for inserting a portion of the tubular member, means for covering the tubular member positioned in the base plate means wherein a portion of a side of the covering means comprises a U-shaped cut-out to permit the tubular member to protrude into the covering means, bolt means inserted through the combination of the base plate means, the tubular member and the covering means for securing the combination, a head of the bolt means being recessed into the side of the container, and wing nut means engaged to the bolt means extended through the covering means for locking the tubular member in a supporting leg position and enabling the tubular member to be pulled-out, rotated and secured in an unlocked handle position. The base plate means comprises a semi-cylindrical groove for inserting the portion of the tubular member.

The objects are further accomplished by providing a method for providing a portable container with a self-locking handle/leg holder for securing a tubular member to the side of the container comprising the steps of attaching the holder to the container with a base plate, providing a cover for the tubular member positioned in the base plate means wherein a portion of a side of the cover comprises a U-shaped cut-out for the tubular member to protrude into the covering means, securing the cover, the tubular member and the baseplate to the side of the container with bolt means inserted therethrough, and providing tension means positioned on the bolt means for self-locking the tubular member in a supporting leg position and enabling the tubular member to be pulled-out and rotated to an unlocked handle position.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 12 is an elevation end view of the portable container of FIG. 10 showing the self-locking handle/leg holder attached to the lower side of the container with the tubular member locked in the leg position, the side of the container being shown in cross section;

FIG. 13 is an elevation end view of the portable container of FIG. 10 showing the self-locking handle/leg holder attached to the lower side of the container with the tubular member raised in the handle position, the side of the container being shown in cross section;

FIG. 14 is a partially exploded end view of the self-locking handle/leg holder attached to the lower side of the container showing the tubular member in the leg position with one-half of the tubular member seated in a semi-cylindrical groove in the base plate of the holder;

DESCRIPTION OF ILLUSTRATIVE EMBODIMENTS

Figure 1:
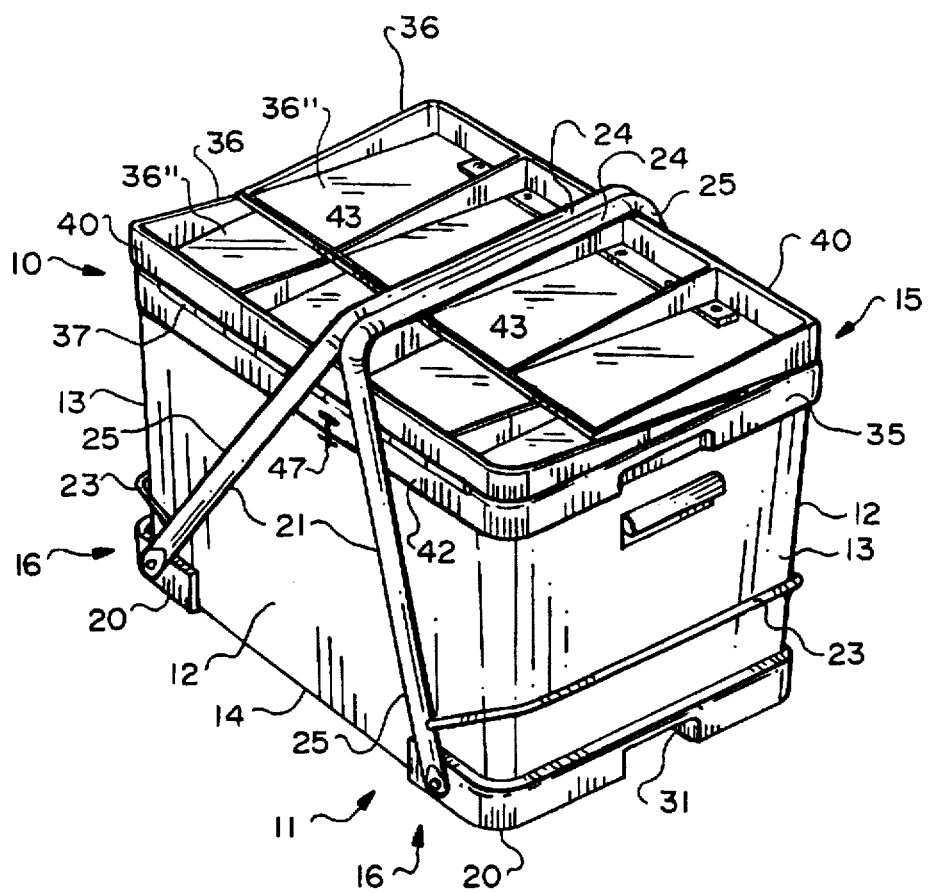
FIG. 1 is a perspective view of a portable container according to this invention in a first position.
Figure 2:
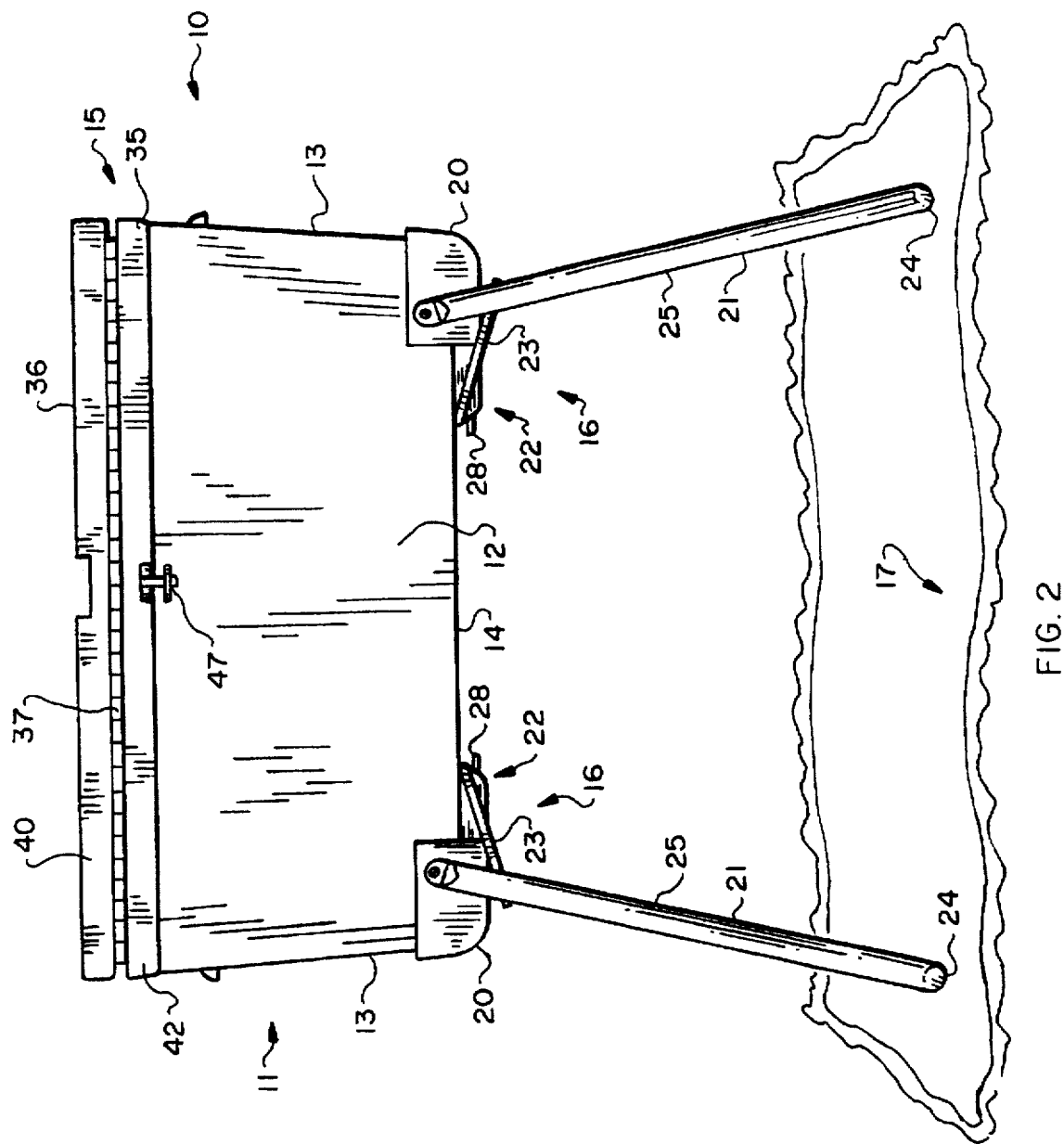
FIG. 2 is a plan view of the portable container of FIG. 1 in a second position.

Referring to FIGS. 1 and 2, a portable container 10 according to the present invention comprises a storage receptacle 11 defined by wall members, including sides 12 and ends 13, a bottom 14, and a movable cover member 15 positionable to overlay the wall members of the receptacle. The receptacle 11 thus defined comprises a substantially hexahedron structure with an internal storage area (not shown) therein. Movement of the cover member 15 from its position overlying the wall members 12 and 13 enables a user to access the internal storage area of the receptacle 11.

Leg means or leg structures 16 attach to the bottom 14 of the receptacle 11 to provide both a handle for carrying the receptacle 11 and legs for supporting the receptacle above a surface 17 such as the ground. Each of the leg structures 16 includes a base structure 20 secured to the bottom 14, U-shaped tubular members 21 extending from the base structure 20, a locking mechanism 22 associated with the base structure 20, and a C-shaped member 23 secured to the U-shaped member 21. The U-shaped members 21 pivot between a first, or carrying, position depicted in FIG. 1 and a second, or supporting, position depicted in FIG. 2.

Each of the U-shaped members 21 include a base member 24 defining the base of the U-shaped members 21 and extending legs 25 defining the arms of the U-shaped members 21. The legs 25 of each of the U-shaped members 21 are spaced from each other a distance greater than the width of the receptacle and extend a distance greater than the height of the receptacle to enable the pivoting of the U-shaped member 21 between the first and second positions. Thus as depicted in FIGS. 1 and 2, respectively, the base member 24 in the first position provides a gripping or grasping surface for supporting the receptacle 1 and in the second position provides the engagement surface for engaging the surface 17 above which the receptacle 11 is supported thereby.

Each C-shaped member 23 secures to and extends between the legs 25 at a distance spaced from the base member 24. Each C-shaped member 23 provides a brace member for the legs 25 and also provide limits for the travel of the U-shaped members 21. Specifically, the C-shaped members 23 of each of the leg structures 16 engage one of the ends 13 of the receptacle 11 as the U-shaped members 21 move to their first position to inhibit movement of the U-shaped members 21 beyond such position. Likewise, the C-shaped members 23 engage the bottom 14 to inhibit movement of the U-shaped members 21 beyond the second position.

Figure 3:
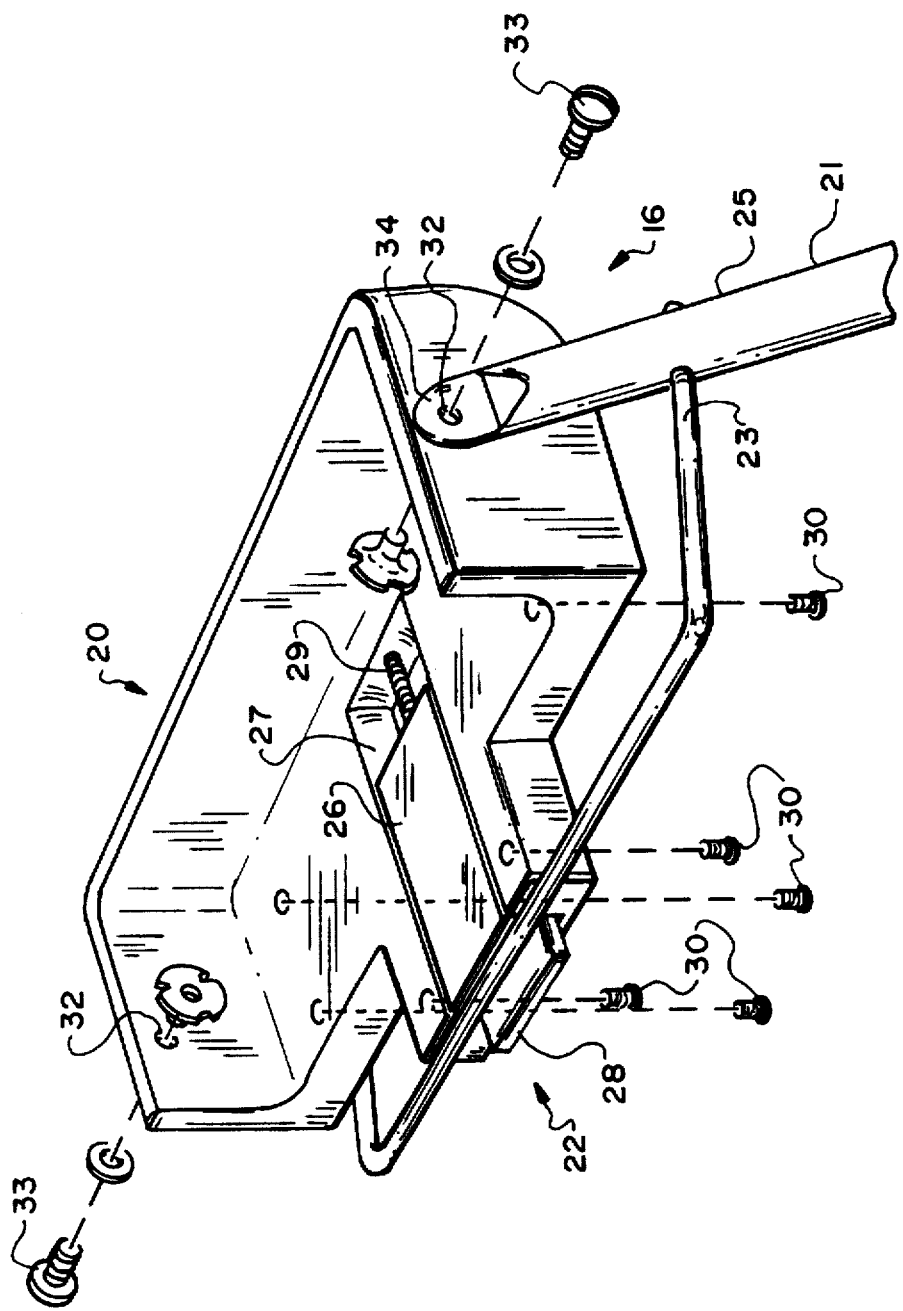
FIG. 3 is an enlarged exploded view of a portion of the portable container of FIG. 1.

The locking mechanism 22 locks the C-shaped member 23 proximate the bottom 14 with the U-shaped member 21 in the second position to thereby lock the U-shaped member 21 in that position. The locking mechanism 22, as depicted in FIG. 3, comprises a sliding member 26 that slides in a slot 27 and an extending tongue member 28 secured to the sliding member 26. The tongue member 28 in an extended position retains the C-shaped member 23 between the tongue member 28 and the bottom 14 to thereby lock the U-shaped member 21 in the second position. Retraction of the sliding member 28 frees the C-shaped member and enables the movement of the U-shaped member 21 between the first and second positions. As will be appreciated, a spring member 29 may be positioned between the end of the slot and the end of the sliding member 26 opposite the tongue member 28 to bias the sliding member 26 into the extended position.

Each of the base structures 20, as depicted in FIG. 3 includes an inner surface for abutting the receptacle with screws 30 or other suitable securing means, such as bonding, fusing, or welding, securing the base structure 20 to the receptacle 11. Additionally the base structure 20 may be formed so as to overlap portions of the walls of the receptacle and may be provided with a depressed gripping area or hand hold 31 (FIG. 1) to facilitate the lifting of the receptacle 11 thereat. Preferably the sliding member 26 includes a portion (not shown) extending into the opening defined by the hand hold 31 enabling a user to control the action of the sliding member 26. The base structure 20 further includes axially aligned apertures 32 which receive threaded ends of bolts 33. Each of the bolts 33 extend through an aperture 34 proximate the free end of the legs 25 to pivotally supports and secure one of the U-shaped members 21 to each of the base structures 20 for enabling the movement of the U-shaped members 21 between the first and second positions.

Figure 4:
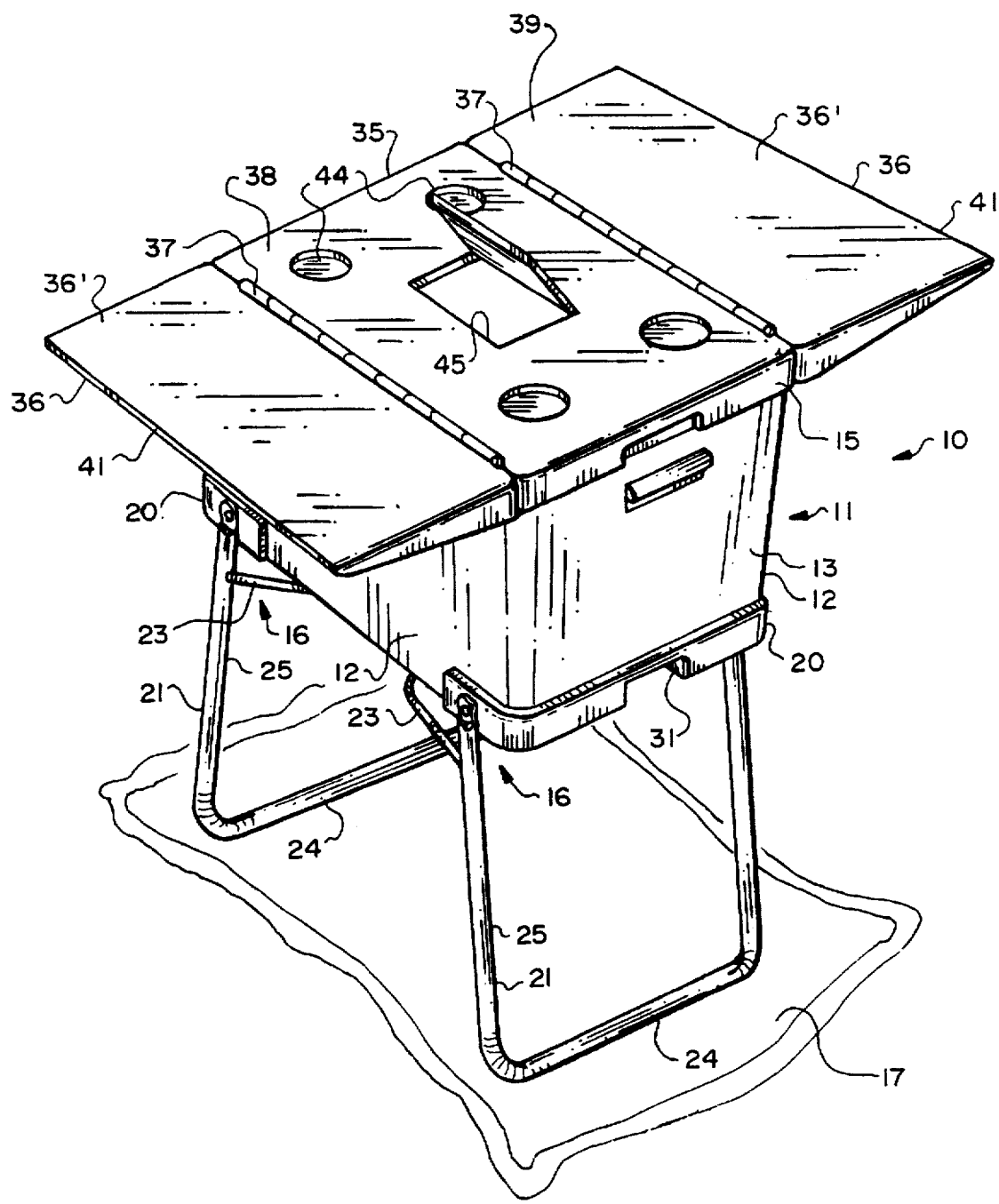
FIG. 4 is a perspective view of the portable container of FIG. 1 in a third position with extensions of a cover extending away from the container to define a table surface.

Referring to FIG. 2 and 4, each leg structure 16 with its U-shaped member 21 locked in the second position shown in FIG. 2 supports the receptacle 11 in a raised condition with the bottom 14 spaced from the surface 17, as described above. The cover member 15 in its position overlying the sides and ends 12 and 13 provides a raised surface. Specifically, the cover member 15 includes a central cover portion 35 overlying the sides and ends 12 and 13 and two leaves or extensions 36 pivotally secured to the central cover portion 35 by hinges 37. The extensions 36 when swung away from an upper planar surface 38 of the central cover portion 35 define a table surface 39 depicted in FIG. 4 and when swung proximate the upper surface 38 define the compact condition of the cover member 15 depicted in FIGS. 1 and 2.

With continuing reference to FIGS. 2 and 4, each of the leaves 36 tapers from a relatively wide edge 40 proximate the hinges 37 to a relatively narrow edge 41 opposite thereto. The wide edge 40 abuts an edge 42 of the central cover portion 35 when defining the table surface 39. The engagement of the edges 40 and 41 provides support to the associated ones of the leaves 36 when defining the table surface 39. The extensions 36 preferably comprise a substantially rigid and resilient molded polymeric material, such as polyethylene. One planar surface 36' forms the table surface 39 when the extension 36 is open. Another planar surface 36" lies on the opposite side of the planar surface 36' and is visible from the top of the cover member 15 when the extension 36 is closed. The extensions 36 additionally included integrally molded stiffening struts 43 that extend normally from the planar surface 36" thereby to provide additional rigidity to the table surface 39. Further, the tapered cross-sectional form of the extensions 36 allows each of the extensions 36, when folded over the central cover portion 35, to lie in a relatively compact form proximate the upper surface 38 and adjacent the other of the extensions 36.

The table surface 39 can be provided with integrally formed depressions, slots, apertures and other structures for receiving the bases of common devices, appliances, tools, food vessels (e.g. plates, utensils, glasses, beverage containers) and the like. Pot example, the upper surface 38 of the central cover portion 35 in FIG. 4 includes circular openings 44 that, in this instance, are particularly suited for receiving soft drink and other beverage retaining cans and glasses.

As another feature of this invention the upper surface 38 includes an aperture 45 and second cover 46 for overlying the aperture 45. This structure provides access through the table surface 39 to the inner storage area portion of the receptacle 11 without otherwise opening or removing the cover member 15.

Thus, to use the present invention a user removes the cover member 15 or pivots it to a vertical position and inserts desired items in the storage area including any desired thermal transfer material (e.g., freezer packs). The user then closes the cover member 15 with the extensions 36 overlying the central cover portion 35 and orients the U-shaped members 21 in the first position, shown in FIG. 1. In this configuration the user can easily grasp the base member 24 or the hand hold 31 in the base structure to transport the receptacle 11. Once the receptacle 11 is positioned proximate a desired location, the user can then move the U-shaped members 21 toward the second position depicted in FIG. 2 and lift the receptacle 11 by the hand holds 31. Lifting the receptacle 11 enables the leg structures 16 to assume the position shown in FIG. 2 and moving the sliding member 26 to the locking position locks the leg structures 16 in place so that the user can then lower the receptacle 11 to a supporting surface.

Once the U-shaped members 21 are positioned below the cover member 15, the extensions 36 can be folded away from the upper surface 38 of the central cover portion 35 to define the table surface 39. Thus, the table surface 39 can be provided as desired whenever the U-shaped members 21 are below the cover member 15. Deployment of the extensions 36 to form the table surface still enables access to the inner storage area of the receptacle 11. However, as those skilled in the art will appreciate the cover member 15 preferably attaches hingedly attaches along the central cover portion 35 to one side 12 and releasably latches to the other side 12 by a latch mechanism 47 (FIGS. 1 and 2). Thus, to further avoid disruption of the table surface once deployed, the user can access the inner compartment through the aperture 45 and cover 46 provided in the central cover portion 35.

After the need for the table is completed, the user merely folds the extensions 36 proximate the upper surface 38. Provided that the U-shaped members 21 have been locked in their second position, the user can then return the container 10 to the carrying mode by releasing the C-shaped members 23 by operation of the locking mechanism 22 and moving the U-shaped members 21 to their first position. This can be accomplished by lifting the receptacle 11 by the hand holds 31 and retracting the sliding members 26 pivoting the U-shaped members 21 toward their first position depicted in FIG. 1. This can be accomplished, for example, by merely lowering the receptacle 11, as the U-shaped members 21 will tend to pivot from the second position toward the first position in this case. The U-shaped members can then be moved to the first position to enable carrying the receptacle thereby.

The container 10 and portions thereof are formed of known materials suitable for their purposes. For example, the C-shaped member is preferably formed of aluminum, stainless steel, or spring steel. The U-shaped members 21 are preferably a hollow tube made of aluminum or stainless steel. The receptacle and the cover member are preferably formed of a relative strong polymer material that is a light weight such as polyethylene. The walls (i.e., the sides and ends 12 and 13), bottom 14, and central cover portion 35 which define the inner storage are also formed of a material which is relatively resistant to heat transfer. Applicant prefers that such parts be formed of double walled molded polyethylene for both strength and insulation.

Figure 5:
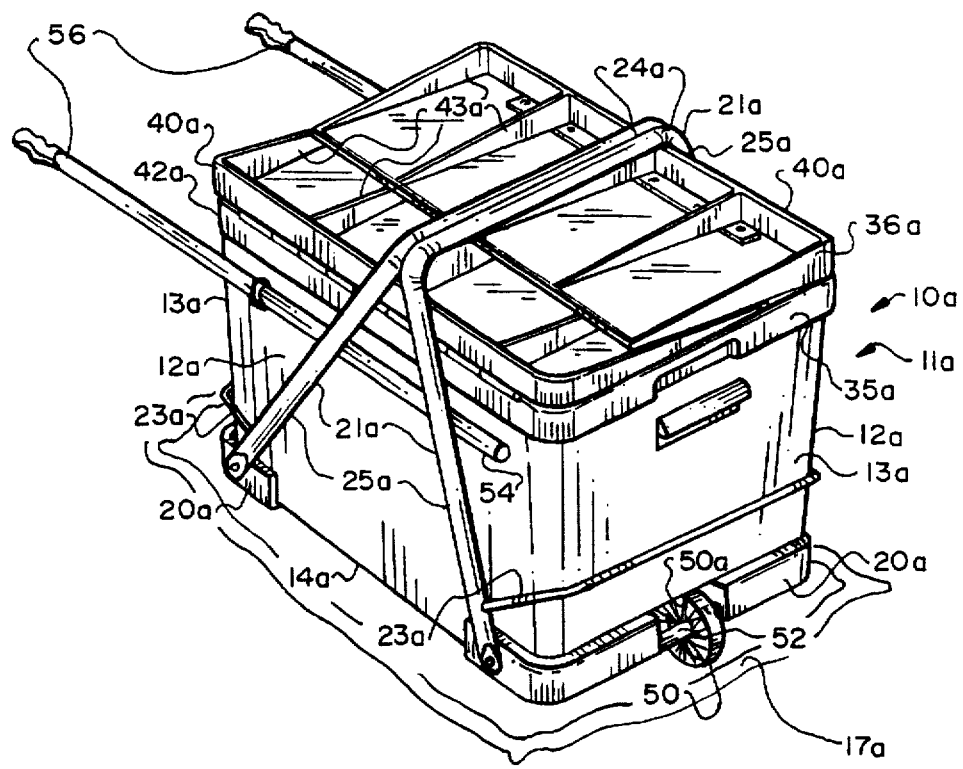
FIG. 5 is a perspective view similar to FIG. 1 of another embodiment of this invention.
Figure 6:
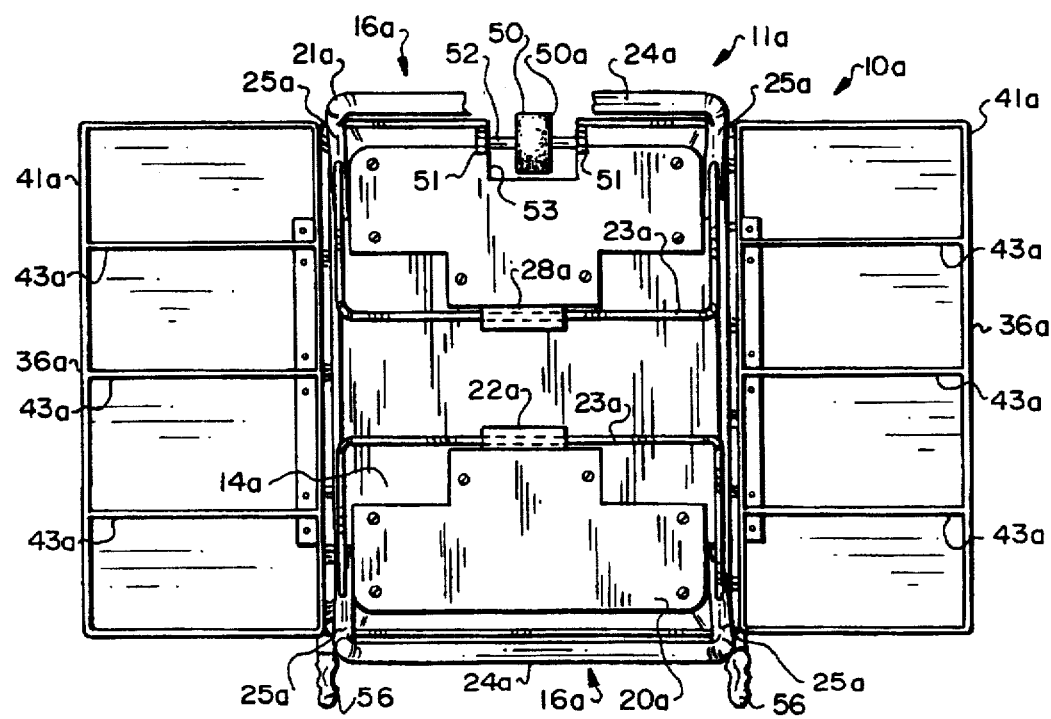
FIG. 6 is a bottom elevation of the portable container of FIG. 5 with extensions of a cover extending away from the container.

FIGS. 5 and 6 depict another embodiment of a container 10A according to this invention that includes a wheel 50 supported for rotation and adapted to engage a relatively planar surface such as ground 17A beneath the bottom of the receptacle. One of the walls 13A and a portion of the bottom 14A of receptacle 11A of the container 10A are formed with a slot or well 50A therein for receiving a portion of the wheel 50. The base structures 20A at the well 50A supports suitable mounting brackets 51 that support an axle 52 carrying the wheel 50. A portion of the wheel 50 extends through an aperture 53 in the base structure 20A that corresponds with the wheel well 50A for enabling free rotation of the wheel 50.

The container 10A additionally includes handles 56 supported by mounts 57 (only one of which is depicted) to each of the sides 12A. The handles 56 preferably retract into the mounts 57 from the extended position with the handles 56 extending away from the one of the ends 13A as depicted in FIG. 5 to position proximate the sides 12A and one of the ends 13A as depicted in FIG. 6. The handles 56, the mounts 57 or both preferably include known detent or other locking apparatus for selectively retaining the handles in a desired position. In the extended position, each of the handles 56 provide a handle that allows a user to lift the receptacle 11A about the axle 52. Lifting the receptacle 11A by the handles 56 transfers much of the weight associated with the receptacle 11A onto the wheel 50 and enables the user to transport the container 10A in a wheel-barrow like fashion. Thus, this embodiment of the container 10A facilitates transport of the receptacle 11A.

The U-shaped members 21A interact with base structures 20A for positioning the U-shaped members in first and second positions providing handles and legs, respectively for supporting the receptacle 11A much like that described with respect to the container 10 of FIG. 1. Likewise, the provision of the cover member 15A with central cover portion 35A and extensions 36A enable formation of a table surface as also described with respect to the container 10 of FIG. 1. It will be understood that the retraction of the handles 56 proximate the one end 13A enables the passage of the U-shaped members 21A between the first and second positions. Thus, this embodiment provides a relatively easily transported portable storage container that can be loaded with a substantial amount of items and thermal material in terms of weight and be transported by an individual. Additionally, the embodiment provides a portable container that also conveniently and easily converts into a table.

Figure 7:
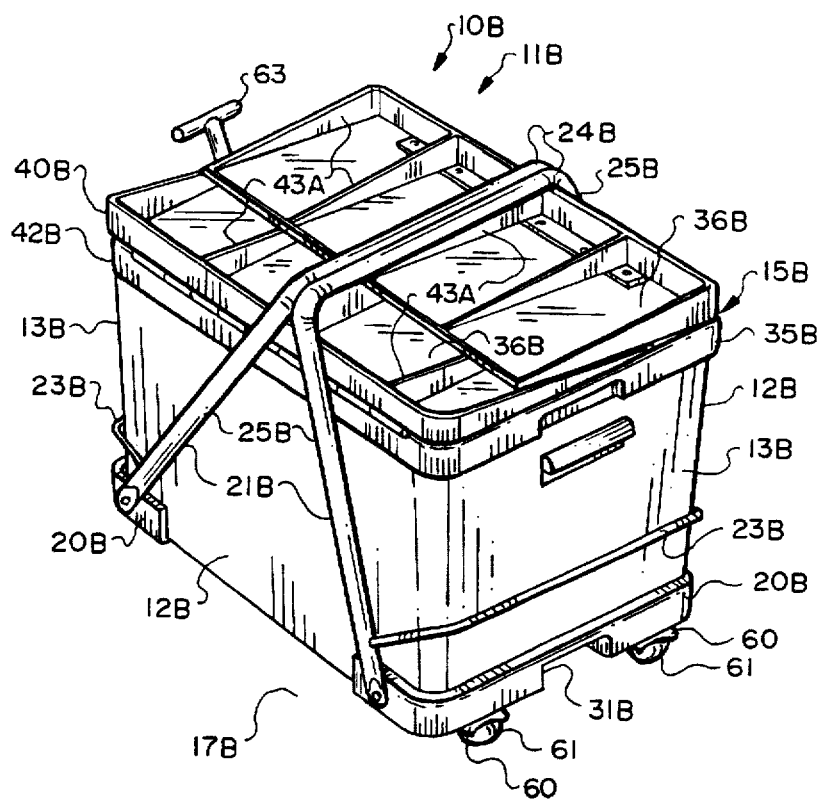
FIG. 7 is a perspective view similar to FIG. 1 of yet another embodiment of this invention.
Figure 8:
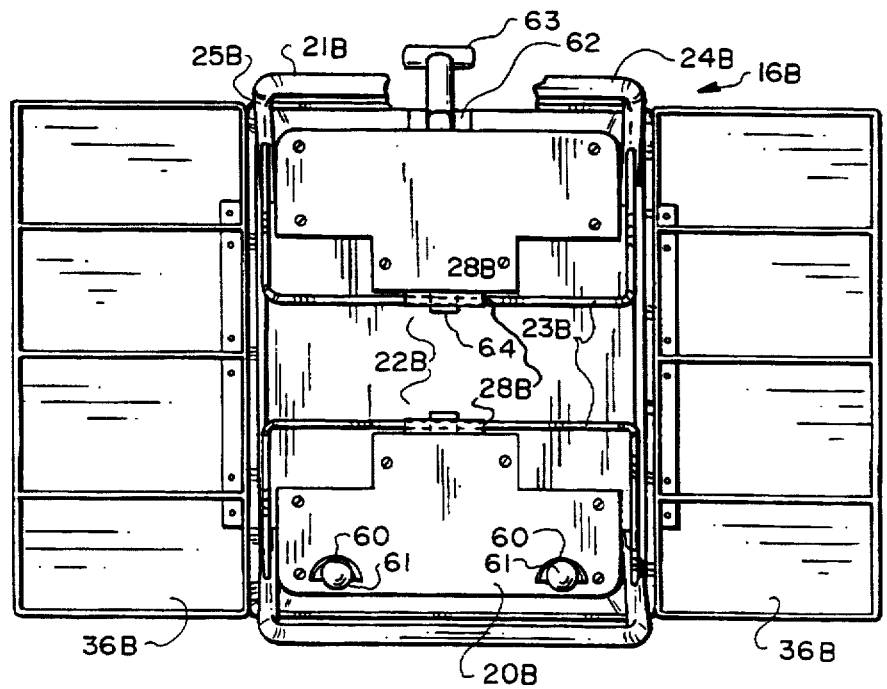
FIG. 8 is a bottom elevation of the portable container of FIG. 7 with extensions of a cover extending away from the container.

A container 10B in FIG. 7 and 8 includes substantially the same components of the containers 10 and 10A of FIGS. 1 and 5, respectively. However, one of the base structures 20B in this embodiment includes a pair of spaced mounts 60 for receiving and supporting suitable rotational supports, such as casters 61. A handle mount 62 secures to the base structure 20A opposite the base structure supporting the two mounts 60. The handle mount 62 preferably pivotal attaches to the base structure 20A enabling movement between a stowed position extending parallel to the end 13A to an operative position diverging extending away from the end 13A. If desired, the handle 63 can also be provides with a telescoping feature to enable a further extension of the handle 63 from the receptacle 11A. The handle 63 provides a convenient surface for a user to grasp and lift a portion of the receptacle 11B clear of the ground 17B. This action transfers much of the weight associated with the receptacle 11A onto the casters 61 to enable the user to pull the receptacle along a surface on the casters 61.

As with the other embodiments described above, the container 10B includes U-shaped members 21B that pivot between first and second positions to define carrying handles that extend above the cover member 15B and legs that extend below the bottom 14B to support the receptacle 11B thereabove. The base structures 20B also include locking devices for selectively engaging C-shaped members 23B to retain the U-shaped members 21B their second positions. A cover member 15B also provides the apparatus for forming an enlarged table surface extending over the open top defined by the walls of the receptacle 11B.

It will be understood that the base structure 20B supports the mounts 60 and the casters 61 sufficiently proximate the outer surface of the receptacles 11A and 11B to permit the U-shaped members 21B and the C-shaped members 23B attached thereto to move between the first and second positions without interference. Additionally, moving the handle 63 to its position extending proximally along the end 13A also enables the movement of the U-shaped members 21B between the first and second positions. However, the C-shaped member is preferably formed with an indented portion 64 to accommodate the handle 63. Those skilled in the art will also understand that various known mechanisms may be employed, if desired, with the containers 10A of FIG. 5 and 10B of FIG. 7 to provide a brake or other device for selectively inhibiting rotation of the wheel 50 and the casters 61, respectively.

Figure 9:
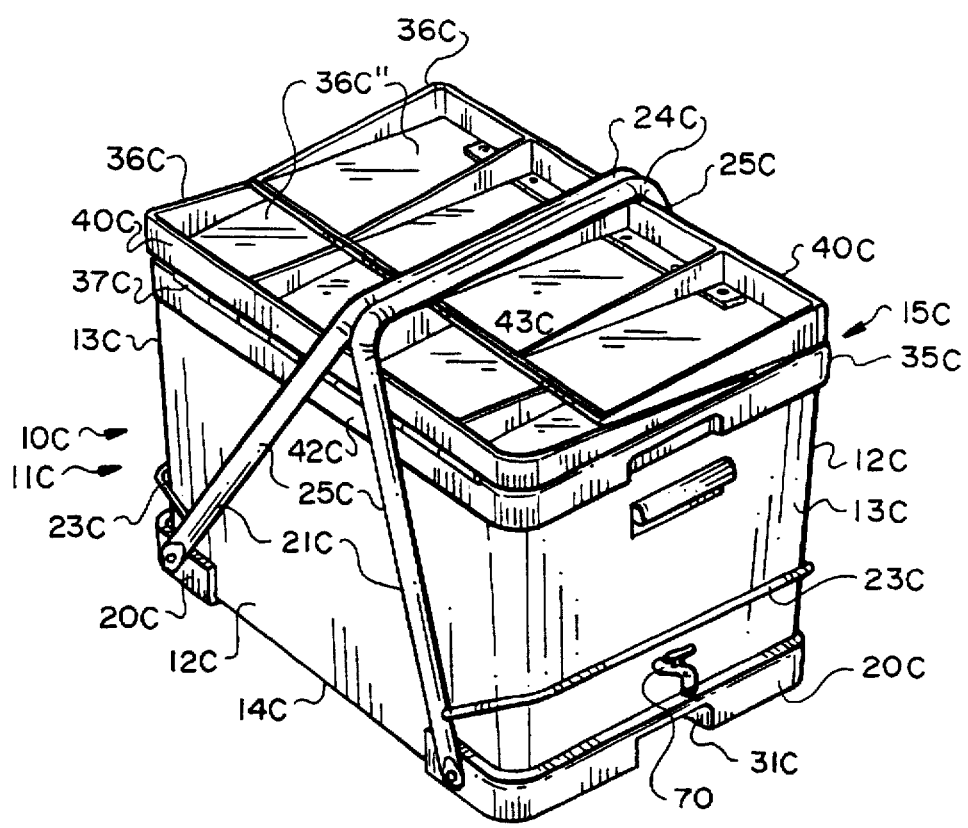
FIG. 9 is perspective view similar to FIG. 1 of still yet another embodiment of this invention.

Another embodiment of this invention depicted in FIG. 9 includes a known fluid dispenser device, such as a spigot 70, mounted in one of the ends 13C. The fluid dispenser enables users to selectively draw fluid, such as water generated by melting ice, from the inner compartment. Those skilled in the art will also appreciate that a fluid dispenser provided with any of the containers 10, 10A, 10B, or 10C of this invention enables use of the container to selectively dispense beverages, such as coffee, cocoa, lemonade and the like. Where the container 10C is primarily used as a beverage dispenser, the legs 25C of the U-shaped member 21C proximate the spigot 70 can be formed shorter than the legs 25C of the opposed U-shaped member 21C to enable more complete drainage through the spigot 70 of liquids in the inner compartment.

Figure 10:
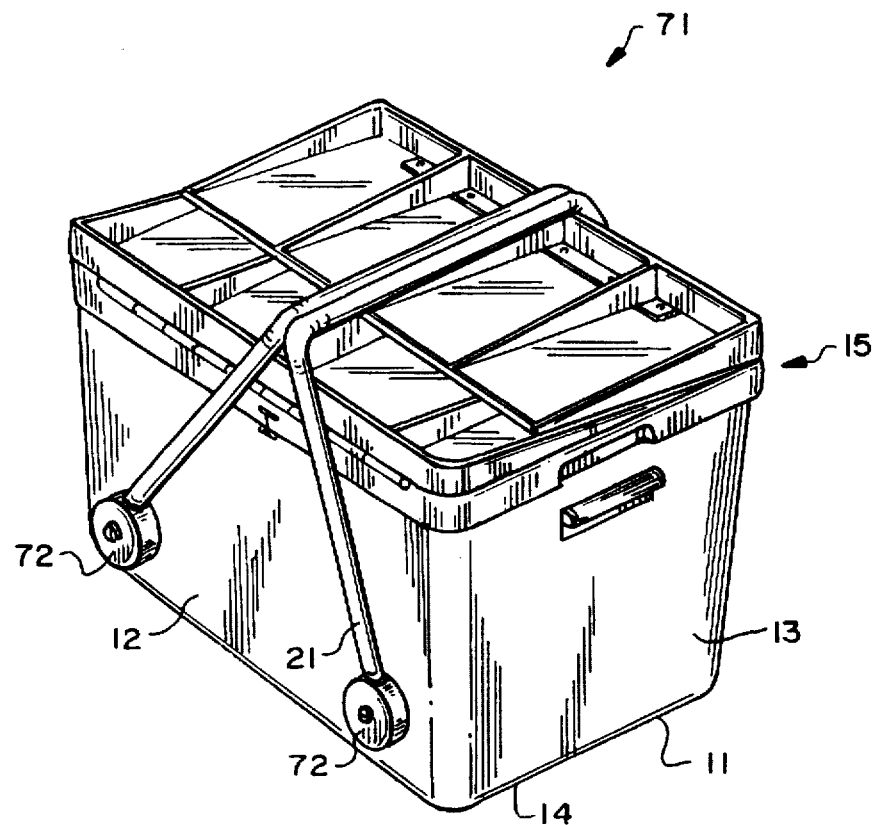
FIG. 10 is a perspective view of another embodiment of the portable container invention in a first position having self-locking U-shaped tubular members.
Figure 11:
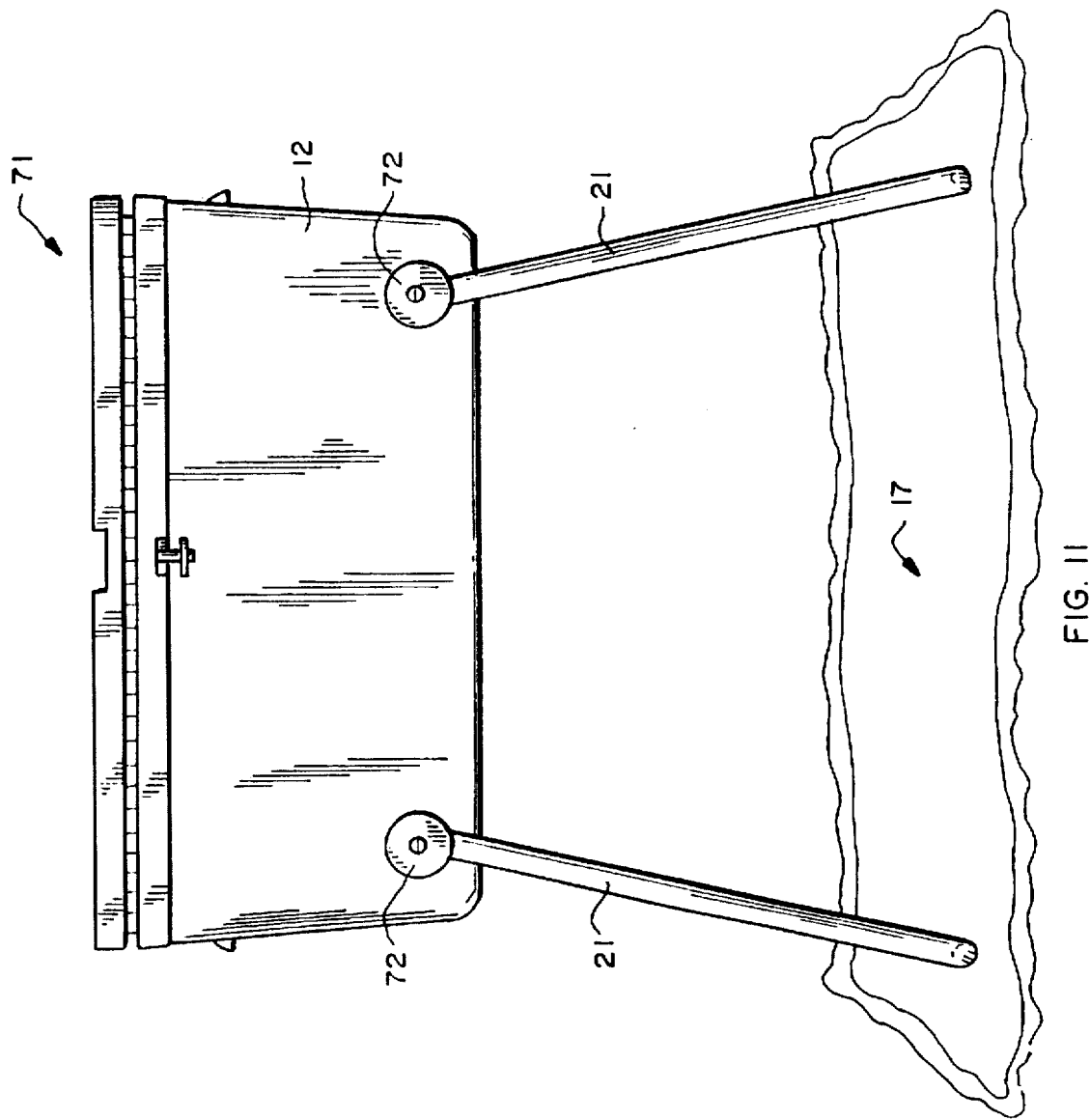
FIG. 11 is a plan view of the portable container invention of FIG. 10 in a second position.

Referring now to FIGS. 10 and 11, another embodiment of a portable container 71 is shown comprising similar features as container 10 described hereinbefore with the exception of the self-locking handle/leg holders 72 for the U-shaped members 21 which are secured to the sides 12 of the container 71. The container 71 comprises the storage receptacle 11 defined by wall members, including sides 12 and ends 13, a bottom 14, and a movable cover member 15. Movement of the cover member 15 from its position overlying the wall members 12 and 13 enables a user to access the internal storage area of the receptacle 11. The sides 12 and bottom 14 are typically approximately ⅝ inches thick comprising light weight insulating material 19 (FIG. 12) commonly used in such containers such as polyethylene.

The U-shaped members 21 attach to the lower sides 12 of the receptacle 11 to provide both a handle for carrying the receptacle 11 and legs for supporting the receptacle 11 above a surface 17 such as the ground. Each of the self-locking handle/leg holders 72 is identical and is secured to the side 12 of the receptacle 11. The U-shaped members 21 pivot between a first or carrying position depicted in FIG. 10 and a second or supporting position depicted in FIG. 11. The tubular members 21 are spaced from each other a distance greater than the width of the receptacle 11 and extend a distance greater than the height of the receptacle 11 to enable the pivoting of the U-shaped tubular member 21 between the first carrying position and the second supporting position.

Referring to FIG. 12, the handle/leg holder 72 is shown which comprises a self-locking cam type mechanism. The holder 74 comprises a base plate 76 having a semi-cylindrical groove 77 and three mounting holes 87 with mounting screws 84, a cover 74, a bolt 80 for securing the holder 72 to the side 12 of the container 71, a spring 78 positioned on the end of the bolt 80 which extends into the sides 12 of container 12 and a nut 82 engaged with the bolt 80 for securing the spring 78, base plate 76, the tubular member 21 and the cover 74. The bolt 80 also functions as an axial for rotating the tubular member 21 between the supporting leg position and the carrying handle position. The nut 82 does not extend into the storage area of the container 12, but remains within the insulating materials 19 of the side walls. Three screws 84 (one being located behind bolt 80) in FIG. 12 are inserted into the three mounting holes 84 in order to attach the base plate 76 to the side 12 of the receptacle 11. The tubular member 21 is shown locked in the semi-cylindrical groove 77 and in the supporting or leg position. In the present embodiment the base plate 76 measures approximately one-half inch deep and two inches in diameter. The cover 74 measures approximately three-quarters inch deep and two and one-quarter inches in diameter. The tubular member 21 is approximately one-half inch in diameter. One skilled in the art will recognize that the dimensions may be varied to accommodate various sizes of the container 72 or receptacle 11.

Referring now to FIG. 13, the tubular member 21 is shown in the raised, carrying or handle position. To accomplish this position from the leg position shown in FIG. 12, the tubular member 21 in grasped and pulled away from the side of the container 71 and rotated upward. When this occurs, the portion of the tubular member 21 seated in the semi-cylindrical groove 77 is removed from it, and the spring 78 is compressed against the base plate 76 thereby permitting the tubular member 21 to be rotated about the bolt 80 into the upward handle position.

Referring now to FIG. 14, a partially exploded view of the self-locking handle/leg holder 72 attached to the lower side 12 of the receptacle 11 showing the tubular member 21 in the leg position with approximately one-half of the tubular member 21 seated in the semi-cylindrical groove 77 in the base plate 76 and the other half of the tubular member 71 is surrounded by the inside of the cover 74. A U-shaped cut-out 88 in the side of the cover 74 (shown in FIG. 15), which is greater than the diameter of the tubular member 21, allows the cover 74 to secure the tubular member 21 against the base plate 76 when the bolt 80, spring 78 and nut 82 are in place and the nut engaged with the end of bolt 80.

Figure 15:
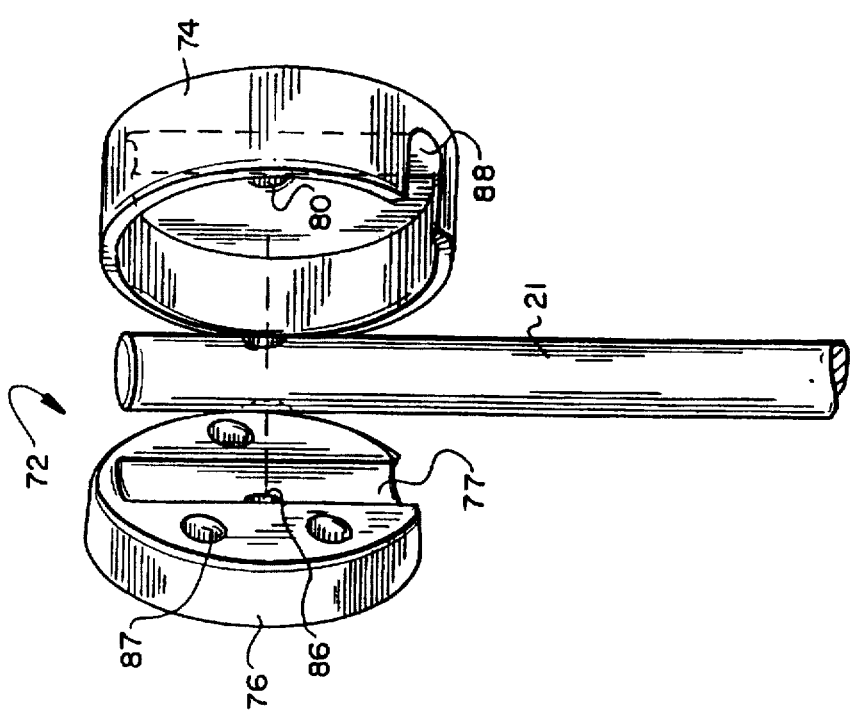
FIG. 15 is an exploded perspective view of the self-locking handle/leg holder showing the semicylindrical groove in the base plate, the tubular member in the leg position and the cover having a U-shaped cut-out in the side, for securing the tubular member within the holder.

Referring now to FIG. 15, an exploded prospective view of the self-locking handle/leg holder 72 showing the semi-cylindrical groove 77 in the base plate 76, the tubular member 21 in the leg position and the cover 74 with the U-shaped cut-out 88 in the side of the cover 74 having a width which is greater than the diameter of the tubular member 21. Each of these elements comprises a hole 86 for insertion of the bolt 80 when the holder 72 is assembled to the side 12 of the container 71 with the spring 78 in place and the nut 82 engaged on the bolt 80.

Figure 16:
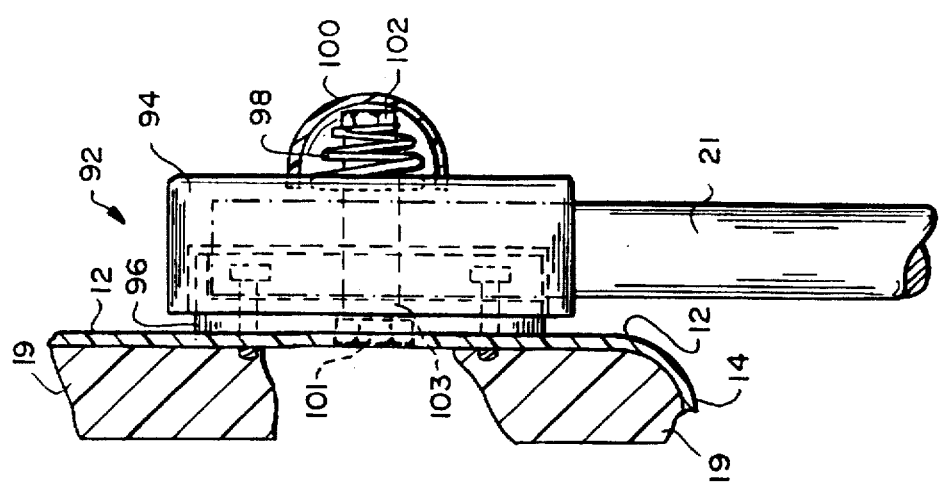
FIG. 16 is an elevation end view of another embodiment of the self-locking handle/leg holder showing the tension spring positioned on the outside of the cover of the handle/leg holder with the bolt head partially recessed into the side of the container and partially recessed into the base plate and the tubular member being in the leg position.

Referring to FIG. 16, another embodiment of a self-locking handle/leg holder 92 is shown with a tension spring 98 positioned on the outside of the cover 94 for the holder 92 with the bolt head 101 being totally recessed into the side 12 of the receptacle 11 or container 71 or it may be partially recessed in both the side 12 and the base plate 96 depending on manufacturing preferences. The base plate 96 is the same as the base plate 76 in the embodiment of FIG. 12. The cover 94 although similar to the cover 74 in FIG. 12, has a recessed hole larger than the diameter of the spring 98 and sufficiently wide in diameter to accept the snap-on cap 100. The cap 100 snaps onto the cover 94 enclosing the spring 98 and nut 102, the spring 98 rests against the recessed portion of the cover 94 when positioned on the bolt 103.

Figure 17:
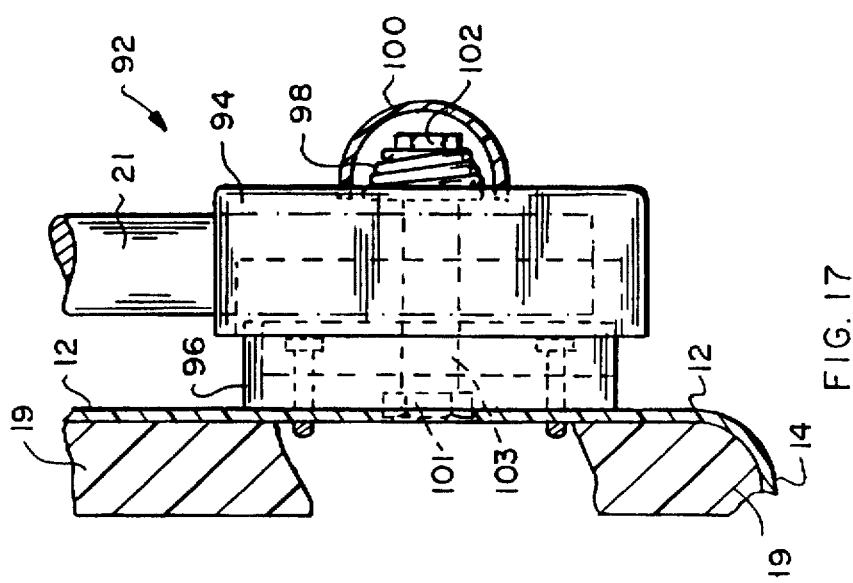
FIG. 17 is an elevation end view of the embodiment of FIG. 16 of the self-locking handle/leg holder showing the tension spring compressed due to the tubular member being in the handle position.

Referring now to FIG. 17, the tubular member 21 of FIG. 16 is shown in the raised or handle position. To accomplish this from the position shown in FIG. 16, the tubular member 21 is grasped and pulled away from the side of the container 71 and rotated about the bolt 103 upward. When this occurs, the portion of the tubular member 21 seated in the semi-cylindrical groove 77 is removed from it and the spring 98 is compressed against the cover 94 and the tubular member 21 rotates into the upward handle position.

Figure 18:
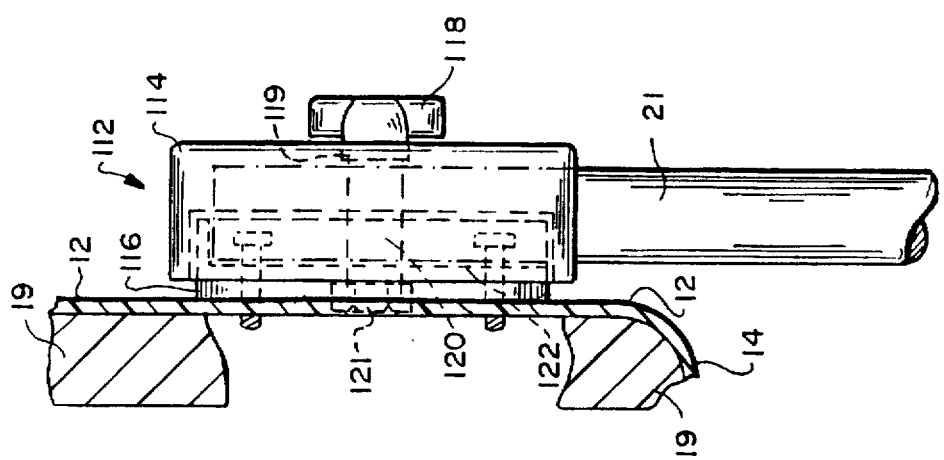
FIG. 18 is an elevation end view of another embodiment of a handle/leg holder showing the tubular member in the leg position and a wing nut for securing the cover and tubular member in the leg position or in a handle position.

Referring now to FIG. 18, yet another embodiment of a handle/leg holder 112 is shown with the tubular member 21 in the leg position. However, this embodiment is not a self-locking embodiment. Holder 112 comprises a base plate 116 having a semi-cylindrical groove 122, three mounting holes (not shown), a cover 114, a bolt 120 for securing the holder 112 to the side 12 of the container 71 and for functioning as an axial about which the tubular member 21 is rotated and a wing nut 118. The head 121 of the bolt 120 is partially recessed into the side 12 of the container 12 and also recessed into the rear of the base plate 116, and the bolt 120 extends through the base plate 116, tubular member 21 and cover 114. The head 121 of bolt 120 may also be totally recessed only into the receptacle side 12 depending on manufacturing preferences. A wing nut 118 engages the threads of the bolt 120. A recessed hole in the outside of the cover 114 permits the shroud 119 of the wing nut 118 to enter this recessed area when the wing nut 118 is tightened against the recessed portion of the cover 114. When the wing 118 shown in FIG. 18 is loosened, and the leg or tubular member 21 grasped and pulled outward, tubular member 21 may be raised or rotated to an upward handle position similarly as occurs with the above embodiments. When the wing nut 118 is now tightened again, the tubular member 21 stays in place in the handle position.

The handle/leg holders 72, 92, 112 and portions thereof are formed of known materials suitable for their purposes. For example, the base plate 76, 96, 116 and covers 74, 94, 114 is embodied in the present embodiments by a material such as Delrin, which is known in the art or such elements may be embodied by metal or plastic materials.

In summary, the foregoing has described and disclosed a portable storage container for maintaining items therein at a differential temperature relative to the ambient temperature. The container includes walls and a bottom defining an open top receptacle with a cover for overlying the open top. The container includes leg members for forming in a first position a carrying handle to promote the transport of the receptacle and in a second position for supporting the receptacle in a raised position above the ground. The features of this invention further include providing the cover with a central portion for overlying the open top and extensions pivotally secured to the central portion. Pivoting the extension relative to the central portion defines a table surface and a relatively compact cover with the extensions overlying the central portion adjacent one another. Additionally, this invention may include, either additionally or separately, handles extending beyond a first wall for grasping by a user and a wheel supported for rotation proximate a wall opposed to the first wall. The combined handle and wheel provides a means facilitating the transport of the container. Further, the tubular members which function both as handles and legs may be attached to the lower side portion of the container via base members or may be attached directly to the sides of the container by handle/leg holders.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A portable container having a self locking handle/leg holder attached to the side of a container for securing a tubular member comprising:

base plate means for attaching said holder to said container;

means within said base plate means for inserting a portion of said tubular member;

means for covering said tubular member positioned in said base plate means wherein a portion of a side of said covering means comprises a U-shaped cut-out to permit said tubular member to protrude into said covering means;

bolt means inserted through the combination of said covering means, said tubular member and said base plate means and within the side of said container for securing said combination; and tension means positioned on said bolt means for self-locking said tubular member in a supporting leg position and enabling said tubular member to be pulled-out and rotated to an unlocked handle position.

2. The portable container as recited in claim 1 wherein:

said base plate means comprises a semi-cylindrical groove for inserting said portion of said tubular member.

3. The portable container as recited in claim 1 wherein:

said tension means comprises a conical spring positioned on said bolt means between a nut and said base plate means so as to protrude into the side of said container.

4. The portable container as recited in claim 1 wherein:

said tension means comprises a conical spring positioned on said bolt means outside of said covering means between said covering means and a nut.

5. A portable container having a handle/leg holder attached to the side of the container for securing a tubular member comprising:

a base plate means for attaching said holder to said container;

means within said base plate means for inserting a portion of said tubular member;

means for covering said tubular member positioned in said base plate means wherein a portion of a side of said covering means comprises a U-shaped cut-out to permit said tubular member to protrude into said covering means;

bolt means inserted through the combination of said base plate means, said tubular member and said covering means for securing said combination, a head of said bolt means being recessed into said side of said container; and wing nut means engaged to said bolt means extended through said covering means for locking said tubular member in a supporting leg position and enabling said tubular member to be pulled-out, rotated and secured in an unlocked handle position.

6. The portable container as recited in claim 5 wherein:

said base plate means comprises a semi-cylindrical groove for inserting said portion of said tubular member.

* * * * *